United States Patent [19]

Kurita et al.

[11] Patent Number: 5,336,421
[45] Date of Patent: Aug. 9, 1994

[54] SPINEL-TYPE SPHERICAL, BLACK IRON OXIDE PARTICLES AND PROCESS FOR THE PRODUCING THE SAME

[75] Inventors: Eiichi Kurita; Haruki Kurokawa; Kazuo Fujioka, all of Hiroshima, Japan

[73] Assignee: Toda Kogyo Corp., Hiroshima, Japan

[21] Appl. No.: 104,401

[22] Filed: Aug. 10, 1993

Related U.S. Application Data

[63] Continuation-in-part of Ser. No. 784,940, Oct. 31, 1991, abandoned.

[30] Foreign Application Priority Data

Nov. 22, 1990 [JP] Japan .................................. 2-319101

[51] Int. Cl.$^5$ .............................................. C04B 35/26
[52] U.S. Cl. ................................ 252/62.62; 423/594
[58] Field of Search ....................... 252/62.62; 423/594

[56] References Cited

U.S. PATENT DOCUMENTS

| | | | |
|---|---|---|---|
| 3,822,210 | 7/1974 | Iwase et al. | 252/62.62 |
| 4,680,130 | 7/1987 | Hibst | 252/62.62 |
| 4,992,191 | 1/1991 | Mori et al. | 252/62.59 |

FOREIGN PATENT DOCUMENTS

| | | | |
|---|---|---|---|
| 0176919A | 2/1986 | European Pat. Off. . | |
| 56-005330 | 4/1981 | Japan . | |
| 56-84322 | 7/1981 | Japan | 423/632 |
| 60-007441 | 1/1985 | Japan . | |
| 61-042665 | 3/1986 | Japan . | |
| 62-091423 | 9/1987 | Japan . | |

*Primary Examiner*—Jack Cooper
*Attorney, Agent, or Firm*—Nixon & Vanderhye

[57] ABSTRACT

Disclosed herein are spinel-type spherical black iron oxide particles containing 1.5 to 17.0 wt % of Zn, and having a specific surface area of 5 to 15 m$^2$/g, a magnetization of not less than 70 emu/g in an external magnetic field of 1 kOe and a coercive force (Hc) of not more than the value obtained from the following expression:

$$Hc(Oe) = 15 + 3 \times (\text{specific surface area of the particles}).$$

and a process for producing the same.

3 Claims, 2 Drawing Sheets

( X 20000 )

SPINEL-TYPE SPHERICAL, BLACK IRON OXIDE PARTICLES AND PROCESS FOR THE PRODUCING THE SAME

This is a continuation-in-part of application Ser. No. 07/784,940, filed Oct. 31, 1991, now abandoned.

BACKGROUND OF THE INVENTION

The present invention relates to spinel-type spherical black iron oxide particles having a large magnetization in an external magnetic field of 1 kOe and as low a coercive force as possible so as to have a small magnetic cohesion, and a process for producing such spinel-type spherical black iron oxide particles.

Spinel-type spherical black iron oxide particles according to the present invention are mainly used as material particles for magnetic toners, magnetic carriers, magnetic cards, etc.

Since spinel-type black iron oxide particles are ferromagnetic particles, they are mixed with a resin so as to produce composite particles, which are used as material particles for magnetic toners and magnetic carriers.

Spinel-type black iron oxide particles are sometimes dispersed in a vehicle so as to obtain a magnetic coating. The thus-obtained magnetic coating is directly applied to a card substrate or a magnetic tape obtained by applying the magnetic coating to a base film is adhered to a card substrate. In this way, spinel-type black iron oxide particles are also used as material particles for magnetic cards such as credit cards provided with a magnetic stripe, railway tickets, railway season tickets, highway passes, telephone cards and railway cards.

In any of the above-described fields, there is no end to demand for higher capacity and higher quality of the products, and spinel-type black iron oxide particles are required to have improved properties, in particular, to have as large an initial magnetization as possible and excellent dispersibility which facilitates the kneading of the particles with a resin or the mixing thereof with a vehicle.

In order to increase the initial magnetization, it is necessary that the magnetization in an external magnetic field of 1 kOe is as large as possible.

In order to increase the dispersibility, it is necessary that the coercive force is as low as possible so as to have a small magnetic cohesion.

This fact is described with respect to spinel-type black iron oxide particles for magnetic toners in Japanese Patent Application Laid-Open (KOKAI) No. 55-65406 (1980), "Magnetic powders for magnetic toners of a one-component type are generally required to have the following properties. I) The magnetic flux density in a magnetic field of about $10^3$ Oe is as high as possible. For example, in an external magnetic field of 1,000 Oe, it is necessary that the maximum magnetization ($\sigma_m$) is about not less than 40 emu/g. This is in order to keep the height of the spike as a magnetic brush high . . . IV) Magnetic powders are well mixed with a resin. The particle size of an ordinary toner is not more than several 10 $\mu$m, so that the microscopic mixing degree in the toner is important for the properties of the toner.

With respect to spinel-type black iron oxide particles for magnetic carriers, this fact is described in Japanese Patent Application Laid-Open (KOKAI) No. 63-33754 (1988), "Since a magnetic resin carrier is a mixture of a magnetic powder and a binder resin which is a nonmagnetic material, the magnetic flux density ($\sigma_s$) is lower than that of a carrier consisting of a magnetic material, so that the magnetic resin carrier is apt to cause bead carry-out in the development, . . . " and "A magnetic resin carrier for electrophotography according to the present invention, has a larger magnetic flux density in an external magnetic field of 1 kOe than a magnetic flux density obtained by a conventional magnetic powder, and the picture quality thereof is excellent, free from bead carry-out", and in Japanese Patent Application Laid-Open (KOKAI) No. 61-53660 (1986), "According to the present invention, . . . the dispersibility of primary particles is improved and the magnetic powder is uniformly dispersed, and the difference in the static property and the magnetic characteristics between magnetic developer particles is reduced".

As to the spinel-type black iron oxide particles as magnetic particles for magnetic cards, this fact is described in Table 2: Properties Required of Magnetic Coated Film and Their Controlling Factors in Magnetic Cards and Chemical Technique at pp. 68 to 72 of *Journal of Chemical Technique, MOL* (1985), published by Ohm-sha, "Required properties 1. High sensitivity, large reproducing output, large saturation, residual magnetic flux density, sharp rising of the initial magnetization curve, . . . "and" . . . the properties are greatly changed with the state of dispersion of a magnetic material . . . . It is important to have a good dispersion system".

Spinel-type black iron oxide particles as material particles for magnetic toners, magnetic carriers and magnetic cards, are generally produced directly from an aqueous solution, namely, by "wet process", because this process makes easy to produce discrete particles, in other words, particles having good dispersibility.

The wet process comprises the steps of: blowing an oxidizing gas in a temperature range of 60° to 100° C. into an aqueous solution which contains an Fe-containing precipitate such as $Fe(OH)_2$ and $FeCO_3$, and which is obtained by mixing an aqueous ferrous salt solution such as ferrous sulfate and an aqueous alkaline solution such as sodium hydroxide and sodium carbonate thereby obtaining a black precipitate, removing the acid radical and the like by washing the precipitate with water, and drying the precipitate so as not to cause color change (Japanese Patent Publication No. 44-668 (1969)).

As a method of improving various properties of the spinel-type iron oxide particles obtained by the wet process, a method of adding a zinc compound to the wet reaction system, thereby obtaining zinc-containing spinel-type iron oxide particles (Japanese Patent Publications No. 42-20381 (1967), and No. 59-43408 (1984), Japanese Patent Application Laid-Opens (KOKAI) No. 56-5330 (1981), No. 61-86424 (1986), No. 62-91423 (1987), and a method of heating such zinc-containing spinel-type iron oxide particles at 300° to 700° C. (Japanese Patent Application Laid-Open (KOKAI) No. 63-68847) are known.

Spinel-type black iron oxide particles having a large magnetization in an external magnetic field of 1 kOe and as low a coercive force as possible so as to have a small magnetic cohesion are in the strongest demand at present, but the spinel-type iron oxide particles obtained in the above-described methods cannot be said to satisfy both properties described above.

As the result of the present inventor's studies, it has been found that spinel-type spherical black iron oxide particles obtained by preparing a mixed suspension containing ferrous hydroxide and zinc hydroxide having a pH of 6 to 9 in a non-oxidizing atmosphere by using an aqueous ferrous salt solution, a zinc compound and an aqueous alkaline solution, and blowing an oxygen-containing gas into the mixed suspension so as to oxidize ferrous hydroxide so that the pH thereof is in the range of not less than 4 and less than 6 when an oxidization degree is such that $Fe^{3+}$ in the mixed suspension is 60 to 70 mol % based on the total amount of iron and zinc in the oxidization step (this case will be referred to as "the oxidization degree is 60 to 70 mol %" hereinunder) have a large magnetization in an external magnetic field of 1 kOe and as low a coercive force as possible. The present invention has been achieved on the basis of this finding.

SUMMARY OF THE INVENTION

In a first aspect of the present invention there are provided spinel-type spherical black iron oxide particles containing 1.5 to 17.0 wt % of Zn and having a specific surface area of 5 to 15 $m^2/g$, a magnetization of not less than 70 emu/g in an external magnetic field of 1 kOe, and a coercive force (Hc) of not more than the value obtained from the following expression:

$$Hc(Oe) = 15 + 3 \times (\text{specific surface area of the particles}).$$

The spinel-type black iron oxide particles have the formula $Zn_xFe_{1-x}O \cdot Fe_2O_3$ in which x has a value in the range of 0.05 to 0.62.

In a second aspect of the present invention there is provided a process for producing spinel-type spherical black iron oxide particles, which comprises the steps of: preparing a mixed suspension which contains ferrous hydroxide and zinc hydroxide and which has a pH of 6 to 9 in a non-oxidizing atmosphere by using an aqueous ferrous salt solution, a zinc compound and an aqueous alkaline solution; and blowing an oxygen-containing gas into the mixed suspension so as to oxidize ferrous hydroxide so that the pH is in the range of not less than 4 and less than 6 when an oxidation degree is such that $Fe^{3+}$ in the mixed suspension is 60 to 70 mol % based on the total mount of iron and zinc in the oxidization step.

DETAILED DESCRIPTION OF THE INVENTION

Figure 1:
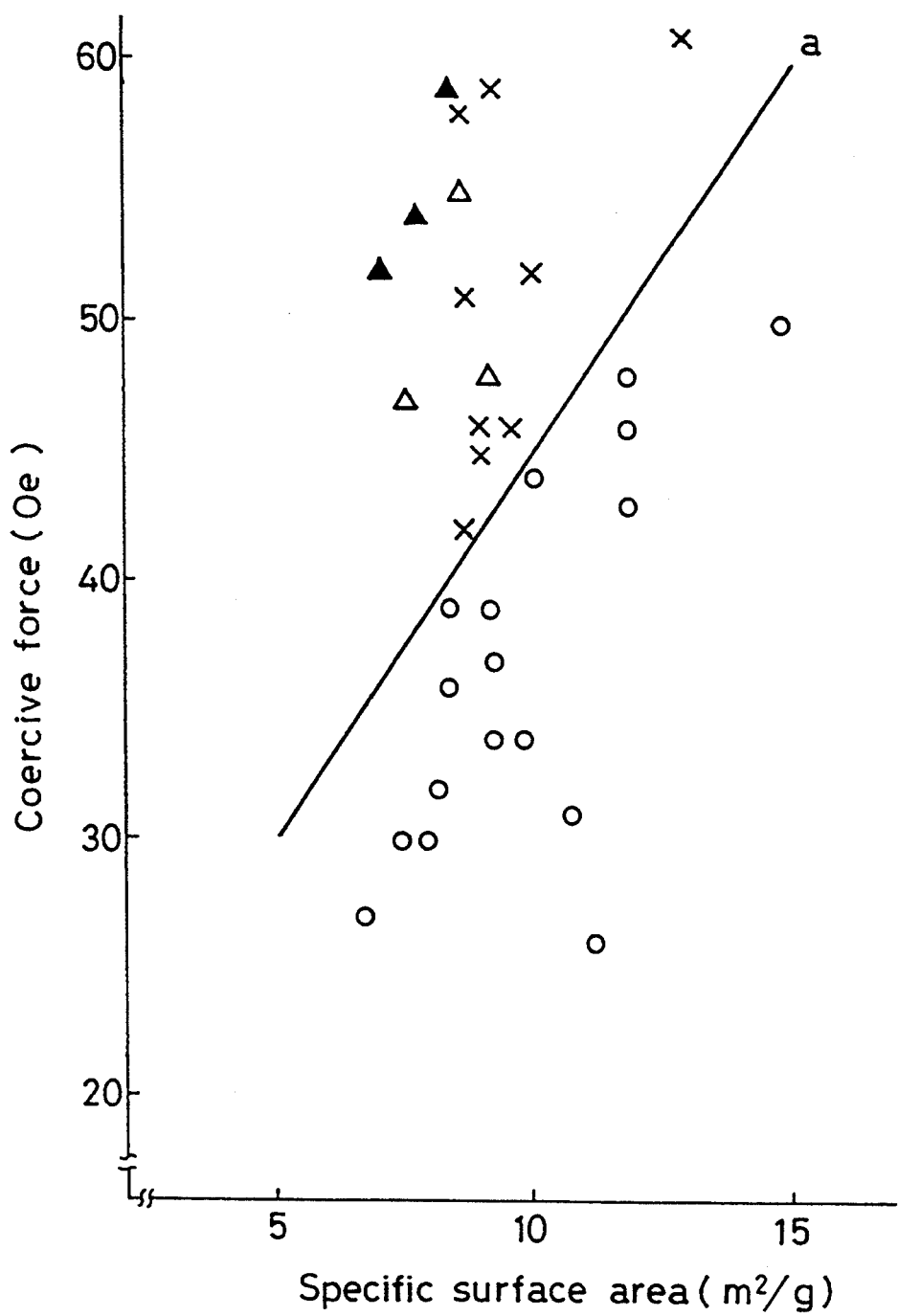
FIG. 1 shows the relationship between the BET specific surface area and the coercive force of spinel-type black iron oxide particles.

As an aqueous ferrous salt solution used in the present invention, an aqueous ferrous sulfate and an aqueous ferrous chloride may be exemplified.

As a zinc compound used in the present invention, zinc sulfate, zinc chloride, etc. are usable.

Examples of an aqueous alkaline solution used in the present invention are an aqueous alkali hydroxide such as aqueous sodium hydroxide, an aqueous alkali carbonate such as sodium carbonate, potassium carbonate and ammonium carbonate, and ammonia water.

The mixed suspension in the present invention is prepared by mixing an aqueous ferrous solution, a zinc compound and an aqueous alkaline solution. The mixing order of these constituents is not specified, and they may also be mixed simultaneously.

The mixed suspension is prepared in an inert atmosphere produced by blowing an inert gas such as $N_2$ into a liquid or onto the liquid surface.

If the atmosphere is not inert, it is impossible to obtain spinel-type black iron oxide particles having a low coercive force.

The pH of the mixed suspension in the present invention is 6 to 9, preferably 6.5 to 8.5. If the pH is less than 6, it is difficult to obtain particles which contain sufficient zinc and, hence, to obtain the target spinel-type black iron oxide particles having a large magnetization and a low coercive force.

If the pH exceeds 9, it is difficult to obtain spinel-type spherical black iron oxide particles having a low coercive force.

In the present invention, the mixed suspension may be aged, if necessary, prior to the oxidization. The aging of the mixed suspension facilitates the production of spinel-type black iron oxide particles having a low coercive force. The aging process is carried out by holding the mixed solution at 40° to 100° C., preferably 60° to 100° C. for a predetermined time, for example, not less than 5 minutes, preferably not less than 20 minutes while blowing an inert gas such as $N_2$ into the liquid or onto the liquid surface.

The mixed suspension is oxidized so that the pH is in the range of not less than 4 and less than 6, when the oxidization degree is such that $Fe^{3+}$ in the mixed suspension is 60 to 70 mol % based on the total mount of iron and zinc in the oxidization step.

If the pH is less than 4, it is difficult to obtain particles which contain sufficient zinc and, hence, to obtain the target spinel-type black iron oxide particles having a large magnetization and a low coercive force.

If the pH exceeds 6, it is also difficult to obtain spinel-type black iron oxide particles having a large magnetization and a low coercive force.

The oxidization in the present invention is carried out by blowing an oxygen-containing gas such as air into the liquid.

The reaction temperature in the present invention is 45° to 100° C., which are temperatures at which spinel-type iron oxide particles are generally produced, preferably 60° to 100° C.

If the reaction temperature is lower than 45° C., it is apt that there exist acicular goethite particles mixed with the spinel-type spherical black iron oxide particles. Even if the reaction temperature exceeds 100° C., it is possible to obtain the target spinel-type iron oxide particles, but in this case, a special apparatus such as an autoclave is required industrially unfavorably.

The spinel-type black iron oxide particles according to the present invention have a specific surface area of 5 to 15 $m^2/g$, preferably 6 to 12 $m^2/g$ and contain 1.5 to 17.0 wt % of Zn, preferably 3.0 to 12.0 wt % based on the spinel-type black iron oxide particles.

It is difficult to produce spinel-type black iron oxide particles having a specific surface area of less than 5 $m^2/g$ by a wet process.

If the specific surface area exceeds 15 $m^2/g$, it is difficult to obtain spinel-type black iron oxide particles having a large magnetization.

When the Zn content is less than 1.5 wt % based on the spinel-type black iron oxide particles, it is difficult to obtain spinel-type black iron oxide particles having a large magnetization and a low coercive force.

If the Zn content exceeds 17.0 wt %, it is difficult to obtain spinel-type black iron oxide particles having a large magnetization.

The oxidization reaction in the present invention may be stopped when the oxidization degree reaches 60 to 70 mol %. From the point of view of economy and industry, however, the aqueous alkaline solution may be further added so that the pH becomes not less than 10. In this way, the un-oxidized iron hydroxide which remains in the reaction mother liquid may be deposited onto the surfaces of the particles produced. This is advantageous from the point of view of prevention of environmental pollution because it is possible to prevent the discharge of the waste liquid containing iron salt.

In the present invention, when the mixed solution is aged prior to the oxidization, it is possible to obtain spinel-type black iron oxide particles having a lower coercive force, for example, a coercive force thereof when aging is lowered in the range of 5 to 13 Oe as compared with that when non-aging.

The present invention will be now explained in the following on the basis of the many experiments carried out by the present inventor.

FIG. 1 shows the relationship between the BET specific surface area and the coercive force of spinel-type iron oxide particles.

The marks of ○, △, ▲, and X represent the spinel-type iron oxide particles produced in accordance with the process of the present invention, the spinel-type iron oxide particles produced directly from aqueous solution in accordance with the process described in Japanese Patent Application Laid-Open (KOKAI) No. 63-68847 (1988), the spinel-type iron oxide particles produced by heating at 500° C. the spinel-type iron oxide particles produced directly from an aqueous solution in accordance with the process described in Japanese Patent Application Laid-Open (KOKAI) No. 63-68847 (1988), and the spinel-type iron oxide particles according to Japanese Patent Application Laid-Open (KOKAI) No. 62-91423 (1988), respectively.

As shown in FIG. 1, the spinel-type iron oxide particles according to the present invention have a lower coercive force than the spinel-type iron oxide particles obtained by a conventional method.

There is generally a close relationship between the particle size and the coercive force of spinel-type iron oxide particles, and the smaller the particle size, namely, the larger the BET specific surface area, the larger the coercive force has a tendency to become. The spinel-type iron oxide particles produced in accordance with the present invention have a lower coercive force than the value represented by the straight line a in FIG. 1.

The straight line a is represented by the following expression:

Coercive force Hc(Oe)=15+3×(specific surface area of particles)

The spinel-type iron oxide particles according to the present invention have a BET specific surface area of 5 to 15 m$^2$/g, preferably 6 to 12 m$^2$/g, a magnetization of not less than 70 emu/g, preferably not less than 71 emu/g in an external magnetic field of 1 kOe, and a coercive force (Hc) of not more than the value obtained from the following expression:

Hc=15+3×(specific surface area of particles), preferably not more than the value obtained from the following expression:

Hc=14+3×(specific surface area of particles), more preferably not more than the value obtained from the following expression:

Hc=13+3×(specific surface area of particles).

As described above, since the spinel-type black iron oxide particles according the present invention have a large magnetization in an external magnetic field of 1 kOe, and as low a coercive force as possible so as to have a small magnetic cohesion, they are suitable as material particles for magnetic toners, magnetic carriers and magnetic cards.

Since the spinel-type black iron oxide particles according to the present invention are produced directly from an aqueous solution, the particles are discrete and the particle shape is a sphere. Therefore, since the spinel-type black iron oxide particles according to the present invention have excellent dispersibility, they are also usable as a known pigment for coatings and a known pigment for coloring resins.

EXAMPLES

The present invention will be explained in more detail while referring to the following examples and comparative examples.

The magnetization and the coercive force of the particles in the following examples and comparative examples were measured by using a "sample vibrating type magnetometer VSM-3S-15", produced by Toei Kogyo K.K. and applying an external magnetic field of 1 kOe thereto.

The specific surface area (m$^2$/g) of the particles was measured by a BET method.

EXAMPLE 1

3-N aqueous NaOH solution and 3.0 l of aqueous zinc sulfate containing 0.7 mol/l of $Zn^{2+}$ were charged into a reaction vessel which was kept in a non-oxidizing atmosphere by flowing $N_2$ gas at a rate of 20 l/min. To the mixture, 17 l of aqueous ferrous sulfate containing 1.76 mol/l of $Fe^{2+}$ was added, and the pH of the mixture was adjusted to 6.8, thereby producing a mixed colloid of $Fe(OH)_2$ and $Zn(OH)_2$ at 85° C.

After $N_2$ gas was blown into the suspension containing the mixed colloid of $Fe(OH)_2$ and $Zn(OH)_2$ for 30 minutes at 85° C. at a rate of 20 l/min, air was blown thereinto for 90 minutes at a rate of 100 l/min.

The oxidization degree at this time was 64 mol %, and the pH of the suspension was 4.2. After the pH of the reaction suspension was adjusted to 11 by adding an aqueous NaOH solution thereto, air was blown into the suspension for 60 minutes so as to deposit a black precipitate. The pH at this time was 11.

The precipitated black particles were filtered, washed with water, dried and pulverized.

The black particles obtained were discrete spherical particles as a result of the observation through an electron micrograph, and the Zn content was 5.47 wt % based on the black particles as a result of X-ray fluorometry.

The particles had a specific surface area of 10.8 m²/g. As to the magnetic characteristics, the coercive force was 31 Oe and the magnetization was 74.4 emu/g.

Examples 2 to 7, Comparative Examples 1 to 4

Black particles were obtained in the same way as in Example 1 except that the concentration of the aqueous ferrous salt solution was varied, the kind and concentration of zinc compound and the method of adding a zinc compound was varied, the pH of the suspension was varied, the aging process was sometimes omitted, the aging time was varied, and the oxidization degree in the oxidization process was varied.

The main conditions for producing the particles are shown in Table 1 and various properties of the particles obtained are shown in Table 2. The particles obtained in Examples 2 to 7 and Comparative Examples 1 and 4 were discrete spherical particles as a result of the observation through an electron micrograph. The particles obtained in Comparative Example 2 were amorphous particles and the particles obtained in Comparative Example 3 were polyhedral particles such as hexahedral and octahedral particles.

Figure 2:
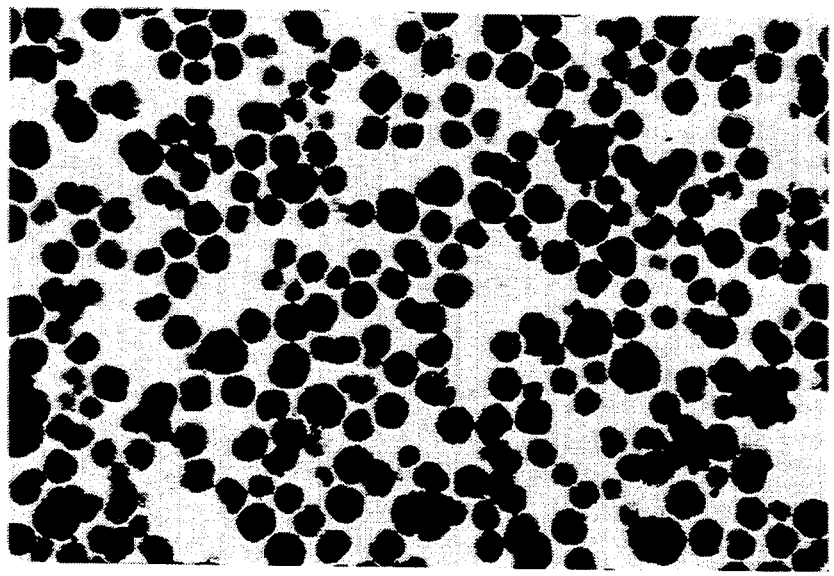
FIG. 2 is an electron micrograph ($\times 20000$) showing the structure of the spinel-type black iron oxide particles obtained in Example 2.

FIG. 2 is an electron micrograph (×20000) of the particles obtained in Example 2.

The BET specific surface area of the particles obtained in Comparative Example 2 was 11.6 m²/g. As to the magnetic characteristics, the coercive force was 97 Oe, and the magnetization was 58.2 emu/g.

In Examples 2 and 3, before blowing air into the suspension for 90 minutes at a rate of 100 l/min, the suspension was gradually oxidized at a rate of 20 l/min for 30 minutes and 15 minutes, respectively. In Comparative Example 1, air was blown at a rate of 20 l/min in place of blowing N₂ gas at a rate of 20 l/min.

TABLE 1

| Example & Comparative Examples | Production of mixed colloid of Fe(OH)₂ and Zn(OH)₂ | | | | | | Aging | | Oxidation | |
|---|---|---|---|---|---|---|---|---|---|---|
| | Aqueous ferrous salt solution Concentration (mol/l) | Zinc compound Kind | Concentration (mol/l) | Method of adding Zn compound* | pH | Temp. (°C.) | Flow rate of N₂ (l/min.) | Time (min.) | Degree of oxidization (mol %) | pH |
| Example 1 | 1.76 | ZnSO₄ | 0.70 | A | 6.8 | 85 | 20 | 30 | 64 | 4.2 |
| Example 2 | " | " | " | B | 7.0 | " | — | — | 66 | 4.5 |
| Example 3 | " | " | " | A | 8.5 | " | — | — | 67 | 5.3 |
| Example 4 | 1.79 | " | 0.50 | A | 6.8 | " | — | — | 64 | 4.1 |
| Example 5 | 1.64 | Zn(OH)₂ | 1.39 | C | " | " | — | — | 64 | 4.2 |
| Example 6 | 1.76 | ZnSO₄ | 0.70 | A | " | " | — | — | 64 | 4.2 |
| Example 7 | " | " | " | A | 8.5 | " | 20 | 20 | 67 | 5.3 |
| Comparative Example 1 | 1.76 | ZnSO₄ | 0.70 | A | 6.8 | 85 | — | — | 64 | 4.1 |
| Comparative Example 2 | " | " | " | A | 5.5 | " | — | — | 60–70 | 3.8 |
| Comparative Example 3 | " | " | " | A | 9.5 | " | — | — | 60–70 | 9.2 |
| Comparative Example 4 | 1.86 | " | 0.11 | A | 6.7 | " | — | — | 67 | 4.2 |

(Note)
*A: Adding Zn compound to aqueous alkaline solution
B: Adding Zn compound to aqueous ferrous salt solution
C: Adding Zn(OH)₂

TABLE 2

| Examples & Comparative Examples | Spinel-type black iron oxide particles | | | | |
|---|---|---|---|---|---|
| | Shape | Zn content (wt %) | BET specific surface area (m²/g) | Coercive force Hc (Oe) | Magnetization (emu/g) |
| Example 1 | Sphere | 5.47 | 10.8 | 31 | 74.4 |
| Example 2 | " | 5.44 | 7.5 | 30 | 73.9 |
| Example 3 | " | 5.41 | 9.2 | 39 | 75.7 |
| Example 4 | " | 1.62 | 8.4 | 36 | 73.2 |
| Example 5 | " | 10.81 | 11.3 | 26 | 71.1 |
| Example 6 | " | 5.43 | 10.1 | 44 | 73.0 |
| Example 7 | " | 5.41 | 9.9 | 34 | 74.6 |
| Comparative Example 1 | Sphere | 5.39 | 9.0 | 46 | 71.8 |
| Comparative Example 3 | Polyhedron | 5.40 | 7.2 | 113 | 63.6 |
| Comparative Example 4 | Sphere | 0.83 | 8.3 | 59 | 65.0 |

What is claimed is:

1. Spinel-type spherical black iron oxide particles having the formula:

$$Zn_xFe_{1-x}O \cdot Fe_2O_3$$

wherein x is a number in the range of 0.05 to 0.62, said particles containing 1.5 to 17.0 wt % of Zn, and having a specific surface area of 5 to 15 m²/g, a magnetization of not less than 70 emu/g in an external magnetic field of 1 kOe and a coercive force (Hc) of not more than the value obtained from the following expression:

$$Hc(Oe) = 15 + 3 \times (\text{specific surface area of the particles}).$$

2. Spinel-type spherical black iron oxide particles having the formula:

$$Zn_xFe_{1-x}O \cdot Fe_2O_3$$

wherein x is a number in the range of 0.05 to 0.62, said particles containing 1.5 to 17.0 wt % of Zn, and having a specific surface area of 5 to 15 m$^2$/g, a magnetization of not less than 70 emu/g in an external magnetic field of 1 kOe and a coercive force (Hc) of not more than the value obtained from the following expression:

$$Hc(Oe) = 15 + 3 \times (\text{specific surface area of the particles})$$

said particles produced by preparing a mixed suspension which contains ferrous hydroxide and zinc hydroxide and which has a pH of 6 to 9 in a non-oxidizing atmosphere by using an aqueous ferrous salt solution, a zinc compound and an aqueous alkaline solution; and blowing an oxygen-containing gas into the mixed suspension so as to oxidize ferrous hydroxide until the pH reaches a value in the range of 4 and 6 and the oxidation degree is such that Fe$^{3+}$ in the mixed suspensions is 60 to 70 mol % based on the total amount of iron and zinc in the oxidization step.

3. A process for producing spinel-type spherical black iron oxide particles having the formula:

$$Zn_xFe_{1-x}O \cdot Fe_2O_3$$

wherein x is a number in the range of 0.05 to 0.62, said particles containing 1.5 to 17.0 wt % of Zn, and having a specific surface area of 5 to 15 m$^2$/g, a magnetization of not less than 70 emu/g in an external magnetic field of 1 kOe and a coercive force (Hc) of not more than the value obtained from the following expression:

$$Hc(Oe) = 15 + 3 \times (\text{specific surface area of the particles}),$$

said process comprising the steps of:
(a) preparing a mixed suspension which contains ferrous hydroxide and sufficient zinc hydroxide to produce black iron oxide particles containing 1.5 to 17.0 wt % zinc by weight based upon the product and which has a pH of 6 to 9 in a non-oxidizing atmosphere by using an aqueous ferrous salt solution, a zinc compound and an aqueous alkaline solution; and
(b) oxidizing the ferrous hydroxide by blowing an oxygen-containing gas into the mixed suspension so as to oxidize ferrous hydroxide until the pH reaches a value in the range of 4 to 6 and the oxidation degree is such that Fe$^{3+}$ in the mixed suspension is 60 to 70 mol % based on the total amount of iron and zinc in the oxidation step.

* * * * *